(12) United States Patent
Murakami et al.

(10) Patent No.: US 9,327,336 B2
(45) Date of Patent: May 3, 2016

(54) METAL JOINT

(75) Inventors: Kazuhiro Murakami, Susono (JP);
Takahiro Ishizawa, Kakegawa (JP);
Mitsuji Kubota, Kosai (JP); Akihiro Hayashi, Kosai (JP)

(73) Assignee: Yazaki Corporation, Tokyo (JP)

( * ) Notice: Subject to any disclaimer, the term of this patent is extended or adjusted under 35 U.S.C. 154(b) by 257 days.

(21) Appl. No.: 14/118,046

(22) PCT Filed: May 10, 2012

(86) PCT No.: PCT/JP2012/061947
§ 371 (c)(1),
(2), (4) Date: Nov. 15, 2013

(87) PCT Pub. No.: WO2012/157501
PCT Pub. Date: Nov. 22, 2012

(65) Prior Publication Data
US 2014/0086671 A1   Mar. 27, 2014

(30) Foreign Application Priority Data

May 18, 2011  (JP) ................................ 2011-111677

(51) Int. Cl.
| B21D 39/03 | (2006.01) |
| F16B 4/00 | (2006.01) |
| F16B 5/04 | (2006.01) |
| F16B 1/00 | (2006.01) |

(52) U.S. Cl.
CPC ............... *B21D 39/031* (2013.01); *F16B 4/00* (2013.01); *F16B 5/045* (2013.01); *F16B 2001/0064* (2013.01); *Y10T 403/49* (2015.01)

(58) Field of Classification Search
CPC ............................. B21D 39/03; B21D 39/035
See application file for complete search history.

(56) References Cited

U.S. PATENT DOCUMENTS

| 2,254,558 A | 9/1941 | Williams |
| 2,924,312 A | 2/1960 | Williams |
| 3,222,779 A * | 12/1965 | Zinniger ............. B21D 39/035 29/566 |
| 3,291,163 A * | 12/1966 | Timmerbeil ......... B21D 39/035 100/33 R |
| 3,728,779 A * | 4/1973 | Behlen ................. B21D 39/035 29/21.1 |
| 5,442,885 A * | 8/1995 | Laven ....................... E04C 3/07 29/453 |
| 2011/0076510 A1* | 3/2011 | Murakami ............. B21D 39/03 428/597 |

FOREIGN PATENT DOCUMENTS

| JP | 6-67961 U | 9/1994 |
| JP | 2001-321856 A | 11/2001 |
| JP | 2006-066616 A | 3/2006 |
| JP | 2010-279961 A | 12/2010 |

OTHER PUBLICATIONS

International Search Report dated Aug. 14, 2012, issued for PCT/JP2012/061947.
Notification of Reasons for Refusal mailed Jul. 7, 2015, issued for the Japanese patent application No. 2011-111677 and English translation thereof.

\* cited by examiner

*Primary Examiner* — Michael P Ferguson
(74) *Attorney, Agent, or Firm* — Locke Lord LLP

(57) ABSTRACT

Disclosed is a metal joint having improved electrical characteristics and mechanical strength. A center swaged part (2) formed by putting metal plates (11, 12) on top of each other, cutting the metal plates (11, 12) along a first to a fourth cut lines (L1 to L4), and depressing a part surrounded by the first to the fourth cut lines (L1 to L4). Metal joint parts are formed on cut surfaces of the first to the fourth cut lines (L1 to L4) because the cut surfaces of the first to forth cut lines (L1 to L4) are, while rubbing each other, depressed.

2 Claims, 4 Drawing Sheets

METAL JOINT

TECHNICAL FIELD

This invention relates to metal joint bodies, more particular to metal joint bodies which two or more plates are joined together to form.

BACKGROUND ART

Conventionally, as a method of jointing metal plates together is known the one that the metal plates are swaged and crimped. The joint by using the above method, however, depends on residual stress or contact by the crimp, and thus has insufficient electric characteristics. Furthermore there have been posed drawbacks that the above contact of the metal plates has many spaces, making it difficult to secure longitudinal electric characteristics in view of corrosion. Furthermore, in order to secure electric characteristics to melt metal plates, for example, with gas or plasma so as to weld the metal plates to each other, it is perceived there also has been posed drawback that its difficulty to automate the method ill-adapts to mass product, and this makes it expensive to make.

Thereby, in order to resolve the aforementioned drawbacks, in the PTL 1, as a method of jointing metal plates together is suggested a method of jointing the metal plates together 110, 111 as shown in FIGS. 7 and 8, by cutting the two metal plates 110, 111, with their stacked, along a cut line L12 extending from one end of a bend line L11 passing the side away from the bend line L11 to the other end of the bend line L11, and by pressing, like bending, a part surrounded by the cut line L12 and the bend line L11 of the two metal plates 110, 111 along the bend line L11, jointing the metal plates 110, 111 together.

This method allows the part surrounded by the cut line L12 and the bend line L11 of the two metal plates 110, 111 to depress while a cut surface inside the cut line L12 rubs on a cut surface outside the cut line L12. This friction makes oxidation layer of the cut surface removed, its new surface exposed, an outside and an inside of the cut line L12 adhered, and metal plates jointed together. The metal plate joint body 101 with the metal joint is provided with a pair of projections 113 projecting in a press direction (namely, the arrow Z) by pressing the part surrounded by the cut line L12 and the bend line L11. The projection 113 is formed so as its top view is trapezoidal-shaped, and short width sides of the pair of trapezoidal-shaped projections (namely, the bend line L11) are each arranged opposed to each other in an interval.

Furthermore, a die using for pressing the two metal plates 110, 111 has a pair of press jigs tapered gradually toward tip thereof. This pair of press jigs is arranged in an interval where the pair of trapezoidal-shaped projections 113 are each formed.

The metal joint described in the PTL 1 was capable of good electrical characteristics by providing metal joint. Disadvantageously, when the metal joint set forth in the PTL 1 experiences drop and impact test, joint thereof disengaged, or some good electric characteristics may worsen. Namely, there has been posed drawback that mechanical strength is insufficient while the metal joint set forth in the PTL 1 may have good electric characteristics.

The PTL 2 discloses that as a method of jointing metal plates together as shown in FIG. 9 is advocated metal joint of forming swaged joint 114 by like plastically deforming such as, with two metal plates 110, 111 stacked together, a local thereof is circularly depressed. The swaged joint 114 has a part of the metal plate 110 engaged in the side of the metal plate 111. The metal joint described in the PTL 2, however, has posed drawbacks that rotation force exerting thereon made it easy to disengage.

CITATION LIST

Patent Literature

[PTL 1]
Japanese Patent Application Laid-Open Publication No. 2006-66515
[PTL 1]
Japanese Patent Application Laid-Open Publication No. 2010-279961

SUMMARY OF INVENTION

Technical Problem

Accordingly, an object of the present invention is to provide metal joint having both improved electric characteristics and mechanical strength.

Solution to Problem

According to one aspect of the invention to achieve the above mentioned object, there is provided A metal joint including two or more metal plates jointed together, comprising: a pair of first cut lines arranged on the metal plates at an interval in an arrangement direction and extending in the arrangement direction; a pair of second cut lines arranged opposed to the pair of first cut lines in a direction perpendicular to the arrangement direction of the first cut lines and extending in the arrangement direction; a pair of third cut lines extending from ends of the first cut lines adjacent to each other along a direction separating from the second cut lines; a pair of fourth cut lines extending from ends of the second cut lines adjacent to each other in a direction separating from the first cut lines; a center swaged part formed by cutting the metal plates along the first to the fourth cut lines with their stacked together and depressing a part surrounded by the first to the fourth cut lines; and a metal joint part formed on cut surfaces of the first to the fourth cut lines.

Preferably, a part of the metal plates surrounded by the pair of third cut lines and a part of the metal plates surrounded by the fourth cut lines are tapered to be deeper as their approaching a center of the center swaged part.

Preferably, a part of the metal plates surrounded by the pair of first cut lines and the second cut lines is recessed perpendicular to a plane of the metal plates.

Preferably, widths between the pair of third cut lines and between the pair of fourth cut lines are each formed to be narrower as their separating from the first cut lines and the second cut lines, respectively.

DESCRIPTION OF EMBODIMENTS

Figure 1:
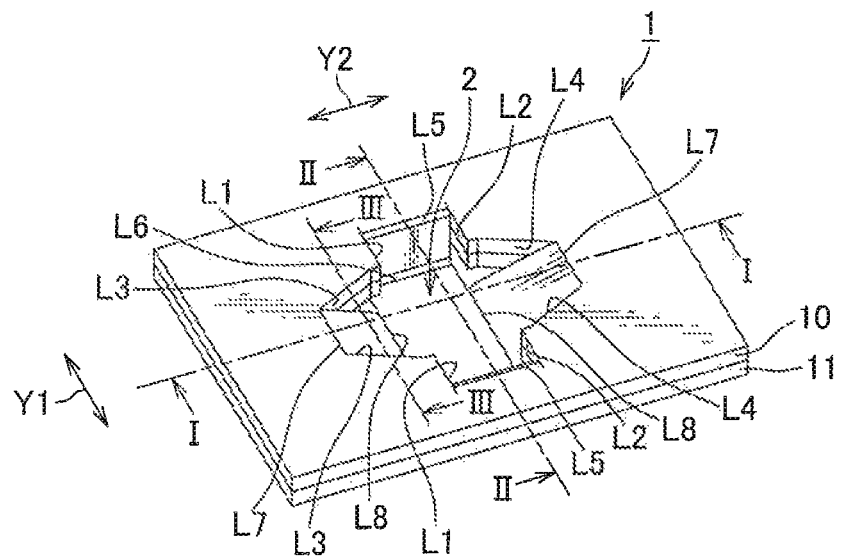
FIG. 1 is a perspective view of a metal joint according to the present invention.
Figure 2:
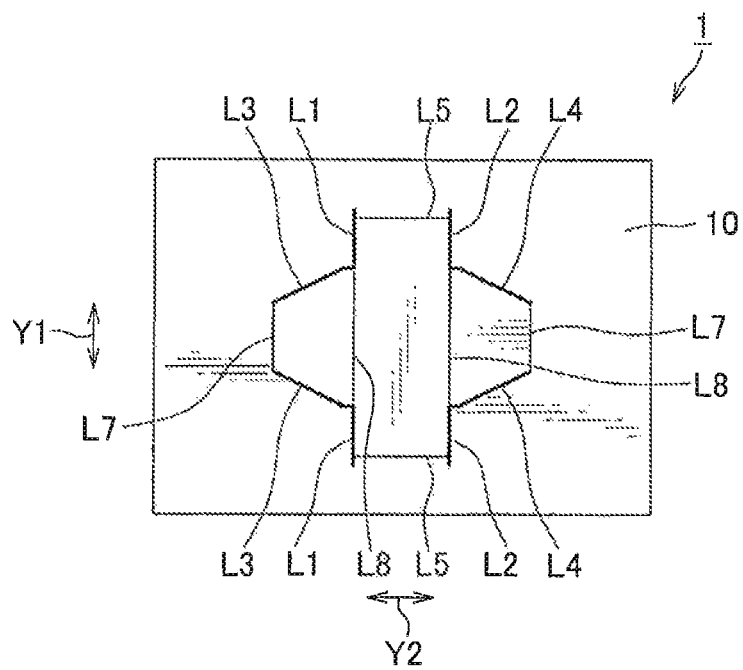
FIG. 2 is a top view of the metal plate shown in FIG. 1.
Figure 3:
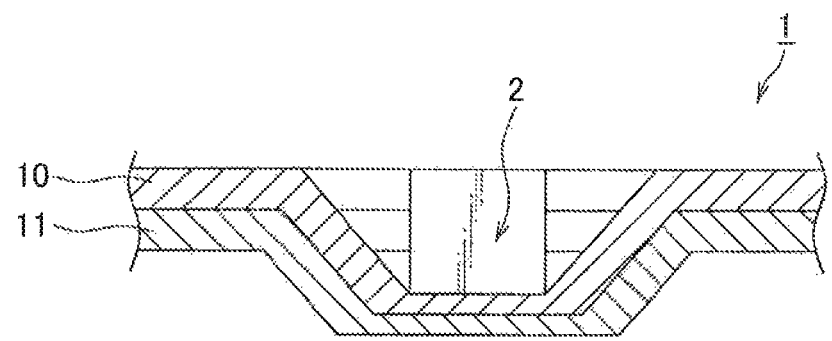
FIG. 3 is a cross-sectional view taken along I-I line of the metal joint shown in FIG. 1.
Figure 4:
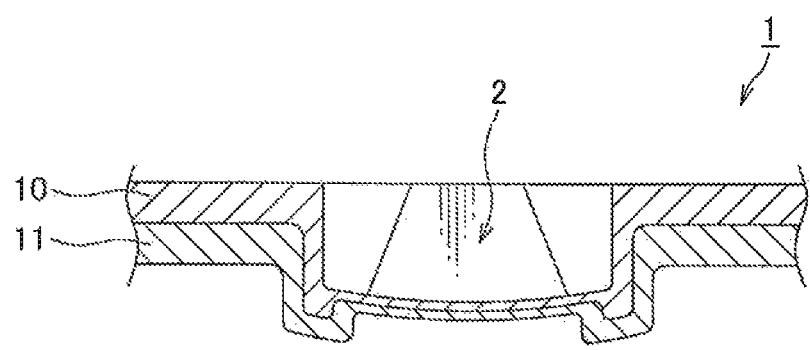
FIG. 4 is a cross-sectional view taken along II-II line of the metal joint shown in FIG. 1.
Figure 5:
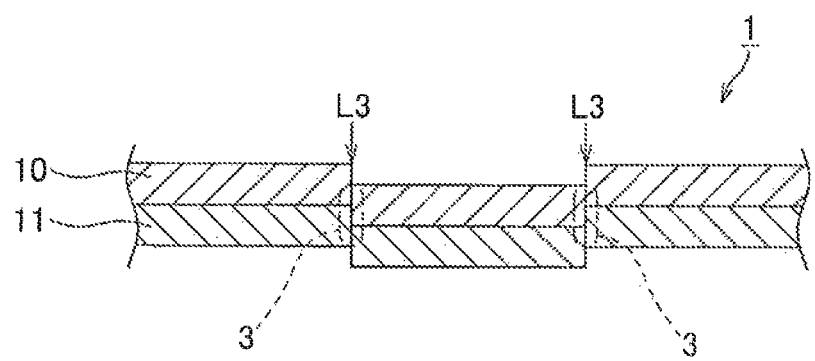
FIG. 5 is a cross-sectional view taken along line of the metal joint shown in FIG. 1.

Hereinafter with reference now to FIGS. 1 to 5, a metal joint according to the present invention is discussed. FIG. 1 is a perspective view of a metal joint according to the present invention. FIG. 2 is a top view of the metal plate shown in FIG. 1. FIG. 3 is a cross-sectional view taken along I-I line of the metal joint shown in FIG. 1. FIG. 4 is a cross-sectional view taken along II-II line of the metal joint shown in FIG. 1. FIG. 5 is a cross-sectional view taken along line of the metal joint shown in FIG. 1.

As shown in the figures, a metal joint 1 is composed of the same metals, and is provided with a two metal plated 10, 11 formed in the same thickness. As shown in FIGS. 1, 2, these metal plates 10, 11 is provided with a pair of cut line L1, a pair of cut line L2, a pair of cut line L3, and a pair of cut lines L4.

The above pair of first cut lines L1 is arranged on the metal plates at an interval and extends along its arrangement direction Y1. The pair of second line L2 is arranged opposed to the pair of first lines L1 in a perpendicular direction Y2. The perpendicular direction Y2 is defined as that perpendicular to the arrangement direction Y1. The pair of second cut line L2 also extends along the arrangement direction Y1. In the present embodiment the first cut line L1 and the second cut line L2 are arranged parallel to each other.

The pair of third line L3 extends from ends adjacent to each other of the first cut lines L1 in a direction separating from the second cut line L2. A width of the third cut lines L3 is formed narrower as their separating from the first cut line L1. The pair of fourth cut line L4 extends from ends adjacent to each other of the second cut lines L2 in a direction separating from the first cut line L1. A width of the fourth cut lines L4 is formed narrower as their separating from the second cut line L2.

The metal joint 1 is provided with a center swaged part 2 and a metal joint 3. The center metal swaged part 2 is, with the metal plates 10, 11 stacked together, formed by cutting the metal plates 10, 11 along the first to fourth cut lines L1 to L4, and depressing a center part surrounded by the these first to fourth cut lines L1 to L4. The center swaged part 2 has the plates 10, 11 plastically deformed and a part of the metal plate 10 engaged with the side of the metal plate 11.

A this time as shown in FIGS. 1 and 2, ends of the first and second cut lines L1 and L2 away from the third cut lines L3 and the fourth curt lines L4 are each connected with line to be bend lines L5, ends of the third cut lines L3 and the fourth curt lines L4 in the first and second cut lines L1 and L2 are each connected with line to be bend lines L6 (see FIG. 1). Then these bend lines L5, L6 are bent so that a part surrounded by the pair of first cut lines L1 and the pair of second cut lines L2 becomes perpendicular to a plane of the metal plates 10, as shown in FIG. 4.

As shown in FIGS. 1 and 2, ends of the pair of third cut lines L3 away from the first cut lines L1 and ends of the pair of fourth cut lines L4 away from the second cut lines L2 are each connected with line to be bend lines L7, and ends of the pair of third cut lines L3 at the side of the first cut lines L1 and ends of the pair of fourth cut lines L4 at the side of second cut lines L2 are each connected with line to be bend lines L8. These bend lines L7 and L8 are bent so that parts each surrounded by the third cut lines L3 and the fourth cut lines L4 of the metal plates 10, 11, as shown in FIG. 3, are tapered to be deeper as their approaching center of the center swaged part 2.

When a center part surrounded by the first to fourth cut lines L1 to L4 is depressed, a cut surface inside the third cut lines L3, as shown in FIG. 3, is rubbed by a cut surface outside the third cut lines L3. Thereby, friction makes oxidation layer of the cut surface of the pair of third cut lines L3 removed, its new surface exposed, the cut surface inside the third cut lines L3 and the cut surface outside the third cut lines L3 adhered as shown in FIG. 5, and metal plate joint 3 obtained. Likewise, the metal joint 3 is obtained also on the cut surface of the pair of forth cut lines L4.

Furthermore, on the cut surface of the first and the second cut lines L1, L2 is in part obtained the metal joints 3.

Figure 7:
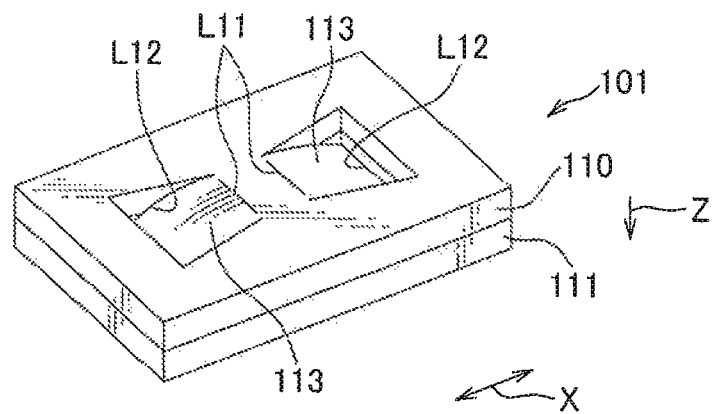
FIG. 7 is a perspective view illustrating one example of a conventional metal joint.
Figure 8:
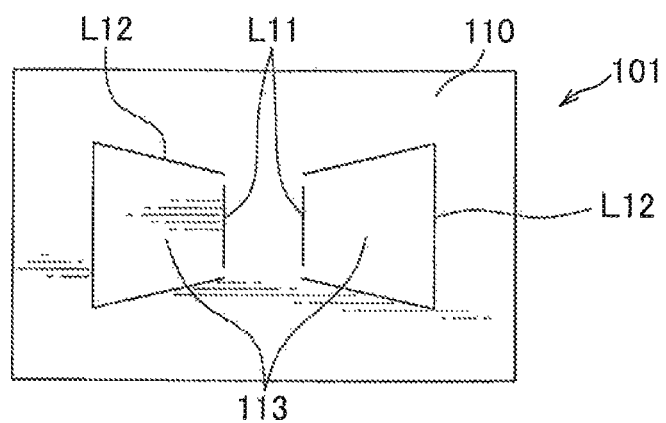
FIG. 8 is a top view of the metal joint shown in FIG. 7.
Figure 9:
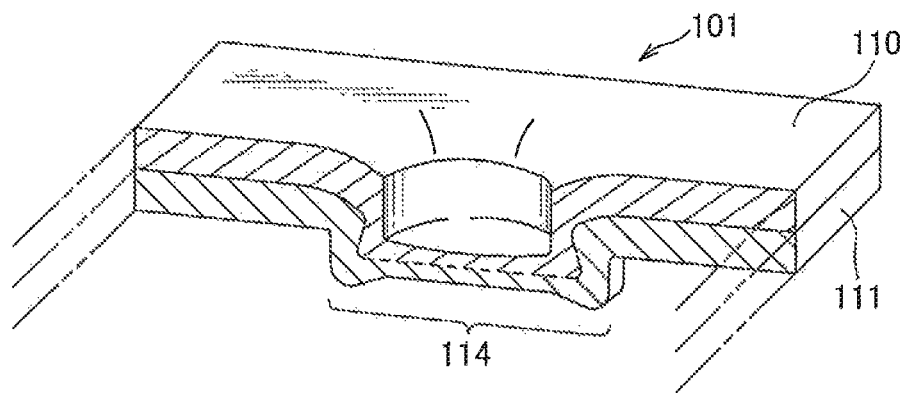
FIG. 9 is a cross-sectional perspective view of one example of the metal conventional joint.

Then, the inventor made an inventive product as shown in FIG. 1 and a conventional product shown in FIG. 7, performed drop and impact test, and checked the effect of the present invention. In the result, the conventional product shown in FIG. 7 exhibited its joint being disengaged, and the conventional one shown in FIG. 9 electrical characteristics being degraded such as increase of resistance value, whereas the invention exhibited its joint and electric characteristics being kept.

Figure 6:
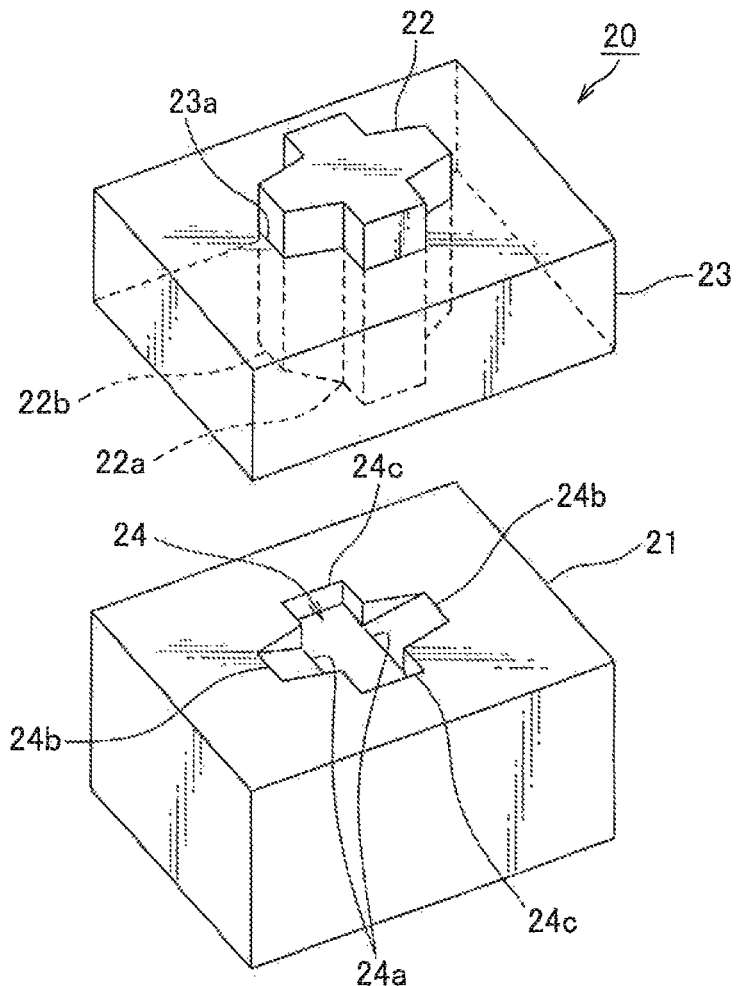
FIG. 6 is a perspective view of the metal joint apparatus making the metal joint shown in FIGS. 1 to 5.

Then, with reference to FIG. 6 a metal joint apparatus for manufacturing the aforementioned metal joint body 1 is discussed. As shown in FIG. 6, the metal joint apparatus 20 is provided with a first die 21 and a second die 22, and a guide 23.

The aforementioned first die 21 is, for example, cuboid-shaped, and has a press hole 24 on an upper face thereof. The press hole 24 is formed in the same shape as the part surrounded by the first to the fourth cut lines L1 to L4, and the bend line L5 and L7. The press hole 24 is arranged such that its depth is made shallower as its approaching an edge 24b where the bend line L7 overlaps from a part 24a where the bend line L8 overlaps. Furthermore, the press hole 24 is made deep vertically from the an edge 24c where the bend line L5 overlaps.

The aforementioned second die 22 is formed into a bar for example. The second die 22 is formed in the same shape as the part surrounded by the first to the fourth cut lines L1 to L4, and the bend line L5 and L7. The second die 22 is tapered away from the first die 21 as its approaching an edge 22b where the bend line L7 overlaps from a part 22a where the bend line L8 overlaps.

The aforementioned guide 23 is, for example, cuboid-shaped, and has a guide hole 23a to be stacked on the press hole 24. The guide hole 23a passes through the guide 23 in a pressing direction. The guide hole 23a is also formed in the same shape as the part surrounded by the first to the fourth cut lines L1 to L4, and the bend line L5 and L7, and passes through and guides the second guide 22 into the guide hole 24 of the first die 21.

Then, a method of manufacturing the metal joint body 1 is described using the aforementioned metal joint apparatus 20. At the first place, the metal plates 10, 11 which are stacked together are laid on the upper surface of the first die 21. Then, the second die 22 is moved along the guide hole 23a of the guide 23 in the pressing direction, between these first die 21 and second die 22 is placed the metal plates 10, 11 which are stacked together.

Furthermore, moving the second die 22 in the pressing direction allows the metal plates 10, 11 stacked together to be cut along the first to fourth cut lines L1 to L4 by an edge of the second die 22 along the first to fourth cut lines L1 to L4 and press hole 24. At the same time, the center part surrounded by the first to fourth cut lines L1 to L4 is depressed so as the center swaged part 2 and the metal joint part 3 are formed, completing the metal joint body 1.

According to the aforementioned metal joint body 1, provision of the center swaged part 2 for securing mechanical strength and the metal joint 3 for improving electric characteristics allows both the electrical characteristics and the mechanical strength to improve. Also, only pressing the joint makes completion thereof easier and lower cost than using particular welding means.

According to the metal joint body 1, in the metal plates 10, 11, parts each surrounded by the pair of third cot lines L3 and the pair of fourth cut lines L4 are tapered deeper as their approaching the center of the center swaged part 2. It follows from this that cut surfaces inside and outside the third cut lines L3 and the forth cut lines L4 assuredly contact to each other, and thereby surface of the metal joint 3 can be made larger, making it possible further to improve its electric characteristics.

According to the metal joint body 1, the aforementioned metal joint 1, in the metal plates 10, 11, arrangement of the part surrounded by the pair of first cut lines L1 and the part surrounded by the second cut lines L2 vertical to the plane of the metal plates 10, 11 allows the mechanical strength to further improve.

According to the metal joint body 1, since the width between the pair of third cut lines L3 and the width between the pair of fourth cut lines L4 are formed to become narrower as their separating from the first cut lines L1 and the second cut lines L2, respectively, the part surrounded by the pair of third cut lines L3 and the part surrounded by the fourth cut lines L4 are depressed so as to further improve its electric characteristics.

Note that according to the above-mentioned embodiment, the part surrounded by the first cut lines L1 and the second cut lines L2 is arranged such as, but not limited to, vertical to the plane the metal plates 10, 11. For example, in the case of requirement for electric characteristics more than mechanical strength, the part surrounded by the first cut lines L1 and the second cut lines L2 is tapered deeper as its approaching the center of the center swaged part 2.

Note that according to the above-mentioned embodiment, the third cut lines L3 and the fourth cut lines L4 is arranged such as, but not limited to, tapered. For example, in the case of requirement for mechanical strength more than electric characteristics, the part surrounded by the third cut lines L3 and the fourth cut lines L4 is arranged vertical to the plane of the metal plates 10, 11.

Note that according to the above-mentioned embodiment, the first cut lines L1 and the second cut lines L2 is arranged, but not limited to, parallel to each other. The first cut lines L1 and the second cut lines L2 are only arranged to extend in the arrangement direction Y, but not in parallel with each other.

Note that according to the above-mentioned embodiment, the distance between the pair of third cut lines L3 and that between the pair of fourth cut lines L4 are formed to become such as, but not limited to, shorter as their separating from the first cut lines L1 and the second cut lines L2, respectively. The pair of third cut lines L3 and the pair of fourth cut lines L4 may each be formed parallel to each other.

Note that according to the above-mentioned embodiment, jointed are such as, but not limited to, two metal plates. The number of metal plates is only required of more than two, but e.g., of three of four.

Note that the aforementioned embodiments merely show such as, but not limited to, typical embodiment of the present invention. Namely, it is to be understood that various changes and modifications will be apparent to those skilled in the art. Therefore, unless otherwise such changes and modifications depart from the scope of the present invention hereafter defined, they should be construed as being included therein.

REFERENCE SIGNS LIST 1 metal joint
2 center swaged part
3 metal joint
10 metal plate
11 metal plate
L1 first cut line
L2 second cut line
L3 third cut line
L4 fourth cut line
Y1 arrangement direction
Y2 perpendicular direction (direction perpendicular to arrangement direction)

The invention claimed is:

1. A metal joint including two or more overlapped planar metal plates jointed together, comprising:
 a pair of first cut lines arranged on each metal plate and perpendicularly extending through a respective plane of each of the metal plates, the first cut lines being aligned in a line extending in a first direction and being spaced apart at an interval in the first direction parallel to the plane of each metal plate;
 a pair of second cut lines arranged on each metal plate and perpendicularly extending through the plane of each of the metal plates the second cut lines being aligned in a line extending in the first direction and being spaced apart at an interval such that each second cut line is opposed to and spaced apart from a respective one of first cut lines in parallel in a second direction perpendicular to the first direction;
 a pair of third cut lines arranged on each metal plate and extending from ends of the first cut lines adjacent to each other along a direction separating from the second cut lines;
 a pair of fourth cut lines arranged on each metal plate and extending from ends of the second cut lines adjacent to each other in a direction separating from the first cut lines;
 a pair of first bend lines arranged on each metal plate, one of the first bend lines connecting ends of the pair of third cut lines located away from the first cut lines, and another of the first bend lines connecting ends of the pair of fourth cut lines located away from the second cut lines;
 a pair of second bend lines arranged on each metal plate, each of the second bend lines connecting ends of a respective pair of opposing first and the second cut lines located away from the third or the fourth cut lines, respectively;
 a center swaged part formed by each of the metal plates being cut along the first to the fourth cut lines with the plates stacked together and by a part surrounded by the first to the fourth cut lines being depressed; and
 a metal joint part formed on cut surfaces of the first to the fourth cut lines,
 wherein a part of the metal plates surrounded by the pair of the first cut lines and the second cut lines is bent at the second bend lines so as to be perpendicular to the plane of each metal plate, and
 wherein a part of the metal plates surrounded by the pair of third cut lines and a part of the metal plates surrounded by the fourth cut lines are each tapered to be deeper in the direction perpendicular to the plane of each metal plate as the parts each approach a center of the center swaged part.

2. The metal joint as claimed in claim 1, wherein widths between the pair of third cut lines and between the pair of fourth cut lines are each formed to be narrower as the widths each separate from the first cut lines and the second cut lines, respectively.

\* \* \* \* \*